United States Patent [19]

Patterson et al.

[11] Patent Number: 5,201,615

[45] Date of Patent: Apr. 13, 1993

[54] REUSABLE BREAK-OUT SUPPORT TOOL AND METHOD

[75] Inventors: Matthew J. Patterson, Bloomfield, Conn.; Keith J. Rockcastle, Aston, Pa.

[73] Assignee: The Boeing Company, Seattle, Wash.

[21] Appl. No.: 931,570

[22] Filed: Aug. 17, 1992

Related U.S. Application Data

[63] Continuation of Ser. No. 589,661, Sep. 28, 1990, abandoned.

[51] Int. Cl.$^5$ .............................................. B23B 47/32
[52] U.S. Cl. ........................................ 408/87; 408/76
[58] Field of Search .................. 408/72 R, 76, 87, 88, 408/95

[56] References Cited

U.S. PATENT DOCUMENTS

| | | | |
|---|---|---|---|
| 979,273 | 12/1910 | Ferries | 408/82 X |
| 2,140,901 | 12/1938 | Etzenhouser et al. | 408/76 X |
| 3,698,759 | 3/1972 | Lund et al. | 164/195 X |
| 4,061,436 | 12/1977 | Durrer | 408/88 X |
| 4,897,000 | 1/1990 | Suzuki | 408/87 X |

FOREIGN PATENT DOCUMENTS

| | | | |
|---|---|---|---|
| 731982 | 9/1932 | France | 408/87 |
| 537761 | 5/1976 | U.S.S.R. | 408/87 |
| 876325 | 10/1981 | U.S.S.R. | 408/87 |
| 1087265 | 4/1984 | U.S.S.R. | 408/87 |
| 1196159 | 12/1985 | U.S.S.R. | 408/72 R |

*Primary Examiner*—Daniel W. Howell
*Attorney, Agent, or Firm*—Jones, Tullar & Cooper

[57] ABSTRACT

A reusable break-out support tool and method are provided for use in drilling, or the like, a workpiece. The tool employs a granulated media situated within a cylinder. When a workpiece is to be drilled, the cylinder with the granulated media is engaged with the side of the workpiece which will bear the exit opening of the hole to be drilled. The granulated media is pressurized whereby it forms a load bearing surface applied to the workpiece.

10 Claims, 2 Drawing Sheets

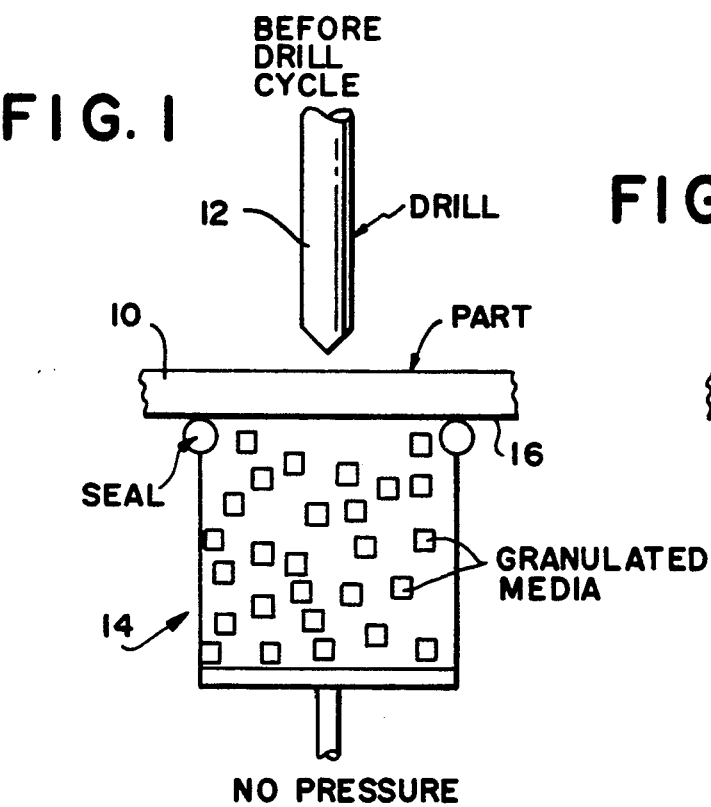
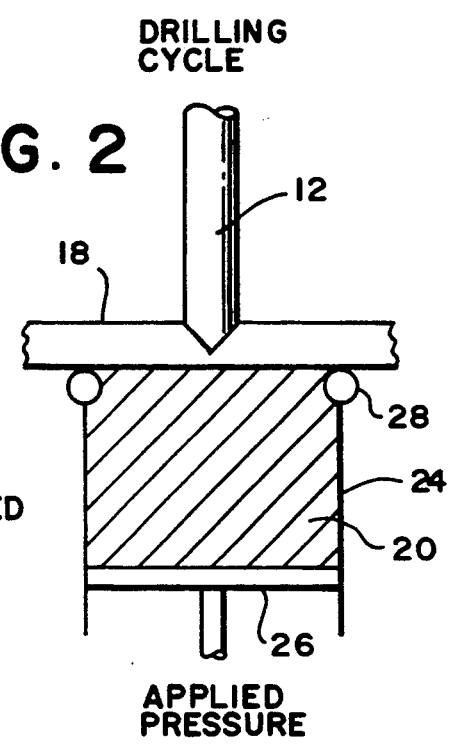
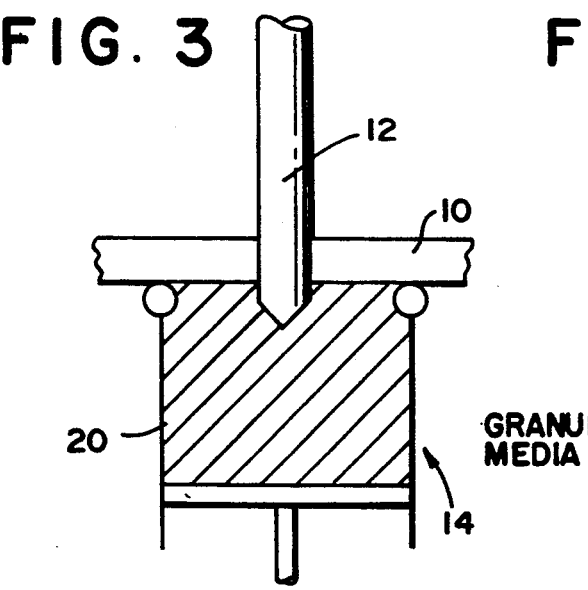
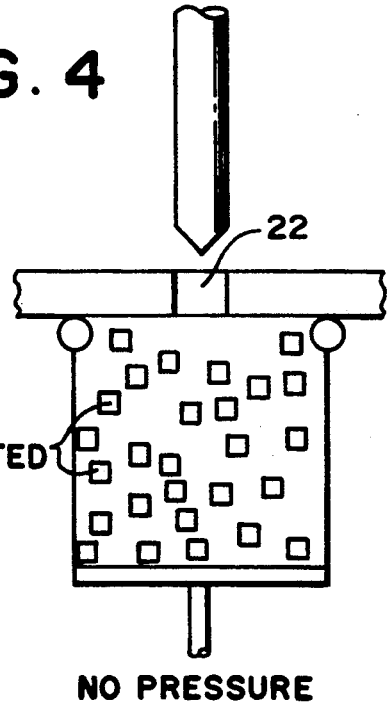

REUSABLE BREAK-OUT SUPPORT TOOL AND METHOD

This is a continuation of co-pending application Ser. No. 07/589,661 filed on Sep. 28, 1990, now abandoned.

BACKGROUND OF THE INVENTION

1. Field of the Invention

This invention relates to both a tool and a method used in the drilling of a workpiece, and in particular a workpiece of composite material, such as resin impregnated composite material. The tool is reusable, while the drilling is produced by another tool which is known.

2. Prior Art

The use of composite material, such as resin impregnated composite material in the aircraft industry is now commonplace. As its use increases, the need to adapt the material also increases. For example, the need to drill composite materials arises, and while drilling may seem to be a routine manufacturing procedure, when dealing with composite materials such as resin impregnated composite materials, the procedure frequently results in problems. For example, the problem of break-out when drilling holes through composite material frequently arises. Because of the nature of composite materials, i.e., those composite materials having fibers or filaments embedded in a resin matrix, the passage of a drill produces at the exit-end of the hole (break-out) dislocations in the form of de-laminations of the fibers and resin. A de-lamination in a composite material can be quite serious as the de-lamination propagates outwardly from the hole into the material. Then, if the material so de-laminated is used as a load bearing part, the potential for structural failure arises with, in particular in the aircraft industry, possible catastrophic consequences.

One solution is to avoid drilling the composite material. This is not always possible, however, considering the increased demand to use such material because of its weight and load redundancy advantages.

It would, therefore, be desirable to have a way of drilling composite material where break-out de-lamination did not occur.

No satisfactory way to solve the noted problem using known techniques could be found.

SUMMARY OF THE INVENTION

From a consideration of the noted problem a tool and method have been devised which eliminates break-out de-lamination. An added advantage results from the reusability of the tool.

A tool now exists for use in conjunction with a drill, which tool engages the workpiece to be drilled on the side of the workpiece opposite to that engaged by the drill and such that it surrounds the area of the workpiece penetrated by the drill. The tool offers support to the workpiece without impeding the drilling operation.

The method provides a procedure for handling the drilling of workpieces such that de-lamination at break-out does not occur.

The tool is reusable, i.e., it is not damaged or altered in use and can therefore effectively serve its purpose again and again.

The tool's reusability derives from its unique capability to change its condition when being used. To do this, the tool employs a granulated media which when pressurized acts as a solid providing a continuous load applying surface to the workpiece which does not impede drill movement through the workpiece but does prevent break-out damage to the workpiece surrounding the hole formed by the drill.

Control of the tool can be co-ordinated with that of the drill by an automatic controller. Alternatively, the tool can be controlled separately from that of the drill, with control being effected manually, if desired.

The workpiece of prime consideration is one made of resin impregnated composite material. However, it is contemplated that other materials, and in particular, soft metals, will also benefit from the invention when they are subjected to drilling.

BRIEF DESCRIPTION OF THE DRAWINGS

Six figures have been selected to demonstrate the invention and a preferred embodiment of the tool. These figures are schematic in nature. Nevertheless, they are sufficiently detailed when considered with the detailed description that follows to enable anyone skilled in the art to practice the invention. Illustrated are:

FIGS. 1-4, which are schematic views of the tool according to the invention. These views are included to illustrate the operability of the invention from both its tool and method aspects. The essential parts of the tool are shown;

The controls usable with the tool of the present invention to coordinate its use with the drill are not shown as known controllers can be employed.

DETAILED DESCRIPTION

At the heart of the present invention lies the discovery that the granulated powdered silicon elastomeric material (granulated media) sold by Dow Corning as X5-8023 can, when placed in a container and pressurized, form somewhat of a solid in terms of its force applying capability but not its force reacting capability. That is, the solid is capable of transmitting the pressure as a uniform force to another surface, as a true solid would, while permitting a more concentrated load to penetrate the solid. It is believed that the pressurization causes the individual granules to act somewhat like a molecular bond in transmitting the pressure. But, since they are in fact not so bonded a more concentrated load directed opposite to the pressure is not inhibited by the pressurized granules.

The physical data published by Dow Corning regarding X5-8023 is as follows:

Boiling Point (@ 760 mm HG): Not Applicable
Specific Gravity (@ 77 Deg. F./25 Deg C.): Approx. 1
Melting Point: Not Applicable
Vapor Pressure (@ 77 Deg. F./25 Deg C.): Not applicable
Vapor Density (Air=1 at 77 Deg. F./25 Deg C.): Not applicable
Percent Volatile by Volume (%): Less than 1
Evaporation Rate (ETHER=1): Not applicable
Solubility in water (%): Insoluble
Odor: Little or no order
Appearance: Solid
Color: Whitish-Yellow Tinge In its essential parts the tool includes a container for the granulated media, and a mechanism for pressurizing the media to form the solid noted above. A seal would probably be needed when the tool is applied to a workpiece to insure pressure integrity. Alternatively, or in addition, specific structure can be provided for holding the tool to the workpiece and this structure could also serve a sealing function.

Figure 5:
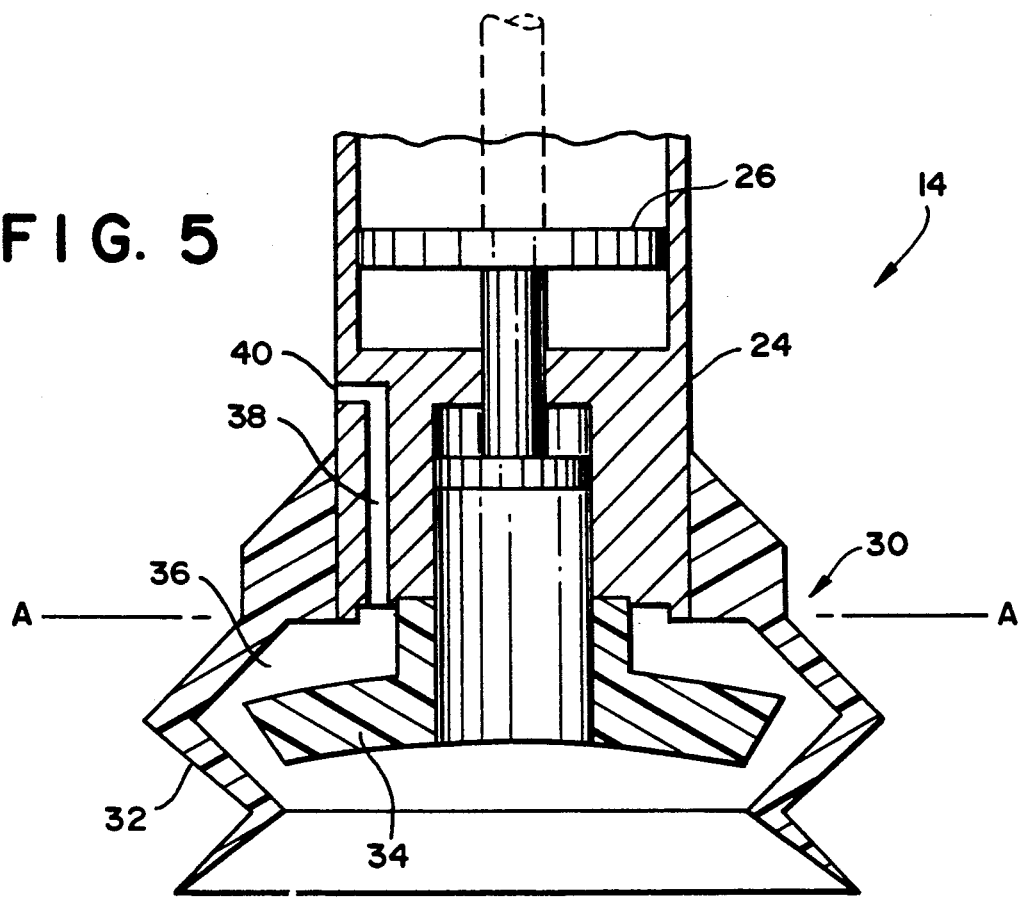
FIG. 5, which is a partial cross-sectional view of the tool according to one embodiment of the invention.

FIGS. 1-4 will illustrate the essential parts noted and will serve to demonstrate the method of the invention. FIG. 5 illustrates an embodiment with the additional specific structure for holding the tool to the workpiece.

In FIGS. 1-4, 10 represents a workpiece of composite material, 12 represents a typical drill, and 14 represents the tool of the invention. In FIG. 1, the tool 14 is shown in engagement with the underside surface 16 (break-out surface) of the composite material 10. The tool, however, is not pressurized. In FIG. 2 the drill 12 is shown as it begins to penetrate the composite material 10. Just prior to the engagement of the drill 12 with the top surface 18 of the composite material 10, the tool 14 is pressurized to generate a solid 20, as noted above. FIG. 3 shows the drill 12 as it penetrates surface 16 and enters the solid 20. Just as the drill 12 penetrates the surface 16 (break-out), the pressurized condition of the tool 14 is removed. FIG. 4 shows the hole 22 drilled in the composite material 10, with the drill 12 withdrawn and the tool 14 depressurized as in FIG. 1.

The composite material 10 may be supported by the tool 14, although preferably, it is separately supported in any conventional manner.

The tool 14 includes a cylindrical housing 24 within which a piston 26 reciprocates. The means for reciprocating the piston are not shown. In addition, the tool 14 has an annular sealing ring 28 situated at the open end of the cylindrical housing 24 which engages the surface 16 of the composite material 10 and provides a seal against pressure loss when the piston 26 pressurizes the granular media in the cylindrical housing.

The tool 14 may be applied to the surface 16 and even pressurized manually, i.e., an operator can manipulate the drill 12 with one hand and the tool 14 with the other hand. For example, the operator can grasp the piston rod and displace it to pressurize the granulated media forming the solid 20 just prior to penetration of the surface 16 by the drill 12. Preferably, however, the tool 14 is mounted to a carriage (not shown) and a controller (not shown) is provided to advance the tool to engage the surface 16 and pressurize the granulated media. Moreover, the controller can be co-ordinated with the drill controller, when, for example, a drill press is used. The two controllers can be integrated so that the functions of the drill 12 and the tool 14 are programmed.

The quantity of granulated media is not critical as practically any thickness of solid 20 will suffice to transmit pressure. It is only necessary, therefore, to have a sufficient quantity of media so that the solid 20 will accommodate drill penetration.

Figure 6:
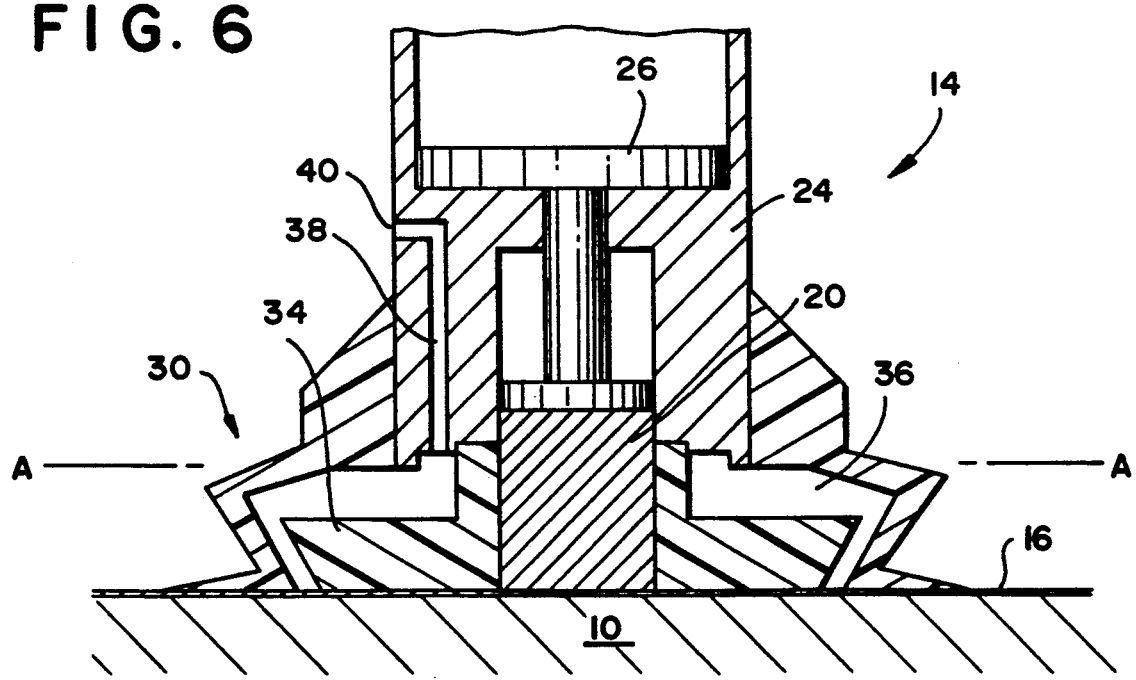
FIG. 6, which shows the embodiment of FIG. 5 in engagement with a workpiece.

In the embodiment shown in FIG. 5, a suction cup 30 is employed which serves to hold the tool 14 against the surface 16. The suction cup 30 is preferably made of rubber and is attached by conventional means to the, preferably aluminum, cylindrical housing 24 at plane A—A. The suction cup 30 includes a levered portion 32 and a central portion 34. An annular chamber 36 is formed by the two portions which is in communication with the bore 38 in the cylindrical housing 24. The bore 38 is open at 40 to which a vacuum pump may be connected for drawing a vacuum with the chamber 36 and bore 38. The vacuum causes the central portion 34 to engage the surface 16 (FIG. 6), while the levered portion 32 serves as a seal. The central portion 34 defines an extension of the granulated media chamber of the cylindrical housing and holds at least part of the solid 20 when the granulated material is pressurized.

When pressure is applied by the piston 26 to the granulated media, a solid 20 is, as noted above, formed, which applies a uniformly distributed force F to the surface 16 (FIG. 2). This force is maintained even after the drill 12 breaks through the surface 16 and penetrates the solid 20 (FIG. 3). It is noted that the penetration of the drill 12 into the body 20 does not damage the body 20, as noted above, so that when the pressure is removed the body 20 returns to a granulated media state (FIG. 4). This advantageous result is the basis for the reusability of the tool 14.

The ability of the body 20 to apply the force F in the first place and its ability to receive the drill 12 without damage to itself while maintaining the force F against the surface 16 is believed to be the most significant factor contributing to the ability of the present tool to eliminate delamination at the break-out of the hole 22.

While this invention has been discussed with reference to a drilling operation, its field of application is broader. For example, the tool and method could be applied in a punching operation. Any manufacturing procedure which would produce a break-out distortion would be a procedure to which the present invention could be applied.

What is claimed is:

1. A reusable break-out support tool for use in the drilling operation of a workpiece, comprising:
   a movable piston;
   a housing cylinder having one end open and its other end adaptable to receive the movable piston; and
   media, normally in a granulated state, within said housing cylinder, whereby said movable piston is displaced relative to said housing cylinder, when said housing cylinder engages said workpiece, to pressurize said media which is thereby formed into a solid state and defines a load bearing surface which applies a substantially uniform load acting against the engaged workpiece surface, and whereby said movable piston is reciprocally displaced relative to said housing cylinder to depressurize said media thereby removing the substantially uniform load and allowing said solid state to return to said granulated media.

2. The tool as defined in claim 1, further comprising: sealing means at the open end of said housing cylinder for engaging the workpiece surface against which said load bearing surface is applied.

3. The tool as defined in claim 1, wherein said piston is displaced manually.

4. The tool as defined in claim 2, wherein the sealing means comprises a sealing ring located at the open end of said housing cylinder.

5. A reusable break-out support tool for use with a drill in the drilling operation of a workpiece of resin impregnated composite material, comprising:
   a movable piston;
   a housing cylinder having one end open and its other end adaptable to receive the movable piston; and
   media, normally in a granulated state, with said housing cylinder, whereby said movable piston is displaced relative to said housing cylinder, when said housing cylinder engages said workpiece, to pressurize said media which is thereby formed into a solid state and defines a load bearing surface which applies a substantially uniform load acting against the engaged workpiece surface, while not impeding movement of the drill into said load bearing surface, and whereby said movable piston is reciprocally displaced relative to said housing cylinder to depressurize said media whereby removing the substantially uniform load and allowing said solid state to return to said granulated media.

6. The tool as defined in claim 5, further comprising:
sealing means at the open end of said housing cylinder for engaging the workpiece surface against which said load bearing surface is applied.

7. The tool as defined in claim 5, wherein said piston is displaced manually.

8. The tool as defined in claim 6, wherein the sealing means comprises a sealing ring located at the open end of said housing cylinder.

9. A reusable break-out support tool for use in the drilling operation of a workpiece, comprising:
a movable piston;
a housing cylinder having one end open and its other end adaptable to receive the movable piston;
granulated media within said housing cylinder whereby when said movable piston is displaced relative to said housing cylinder to pressurize said granulated media, when said housing cylinder engages said workpiece, said granulated media forms a load bearing surface acting against the engaged workpiece surface;
sealing means at the open end of said housing cylinder for engaging the workpiece surface against which said load bearing surface is applied, wherein the sealing means comprises a suction cup attached to the open end of said housing cylinder.

10. A reusable break-out support tool for use with a drill in the drilling operation of a workpiece of resin impregnated composite material, comprising:
a movable piston;
a housing cylinder having one end open and its other end adaptable to receive the movable piston;
granulated media within said housing cylinder; and
sealing means at the open end of said housing cylinder for engaging the workpiece surface against which said load bearing surface is applied, said sealing means comprising a suction cup attached to the open end of said housing cylinder, whereby when said movable piston is displaced relative to said housing cylinder to pressurize said granulated media, when said housing cylinder engages said workpiece, sand granulated media forms a load bearing surface acting against the engaged workpiece surface.

* * * * *